(No Model.)
R. W. TERRELL.
COFFEE POT.
No. 412,138. Patented Oct. 1, 1889.
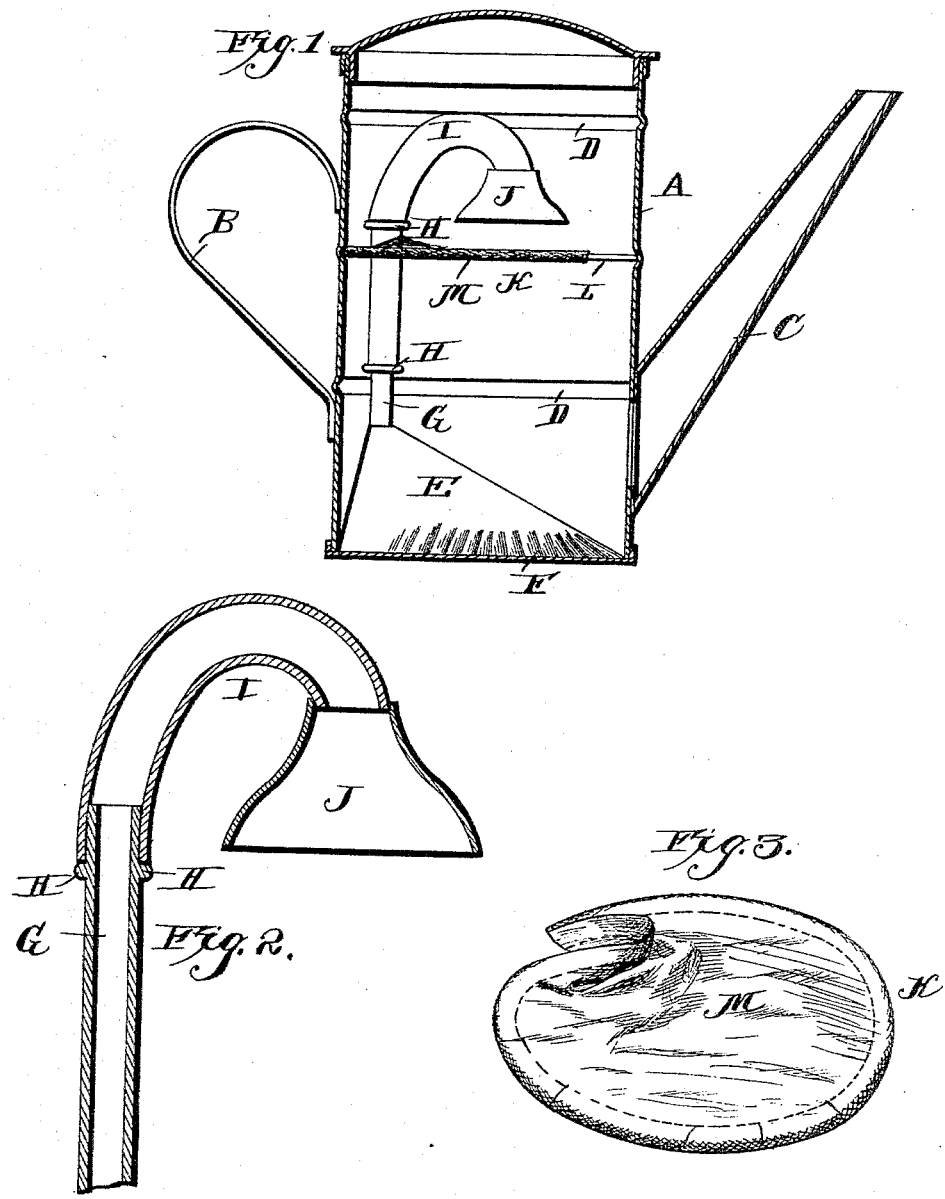
Witnesses
Henry G. Dieterich
R. W. Bishop.
Inventor
Robert W. Terrell
By his Attorneys,
C. A. Snow & Co.

UNITED STATES PATENT OFFICE.

ROBERT W. TERRELL, OF CONYERS, GEORGIA.

COFFEE-POT.

SPECIFICATION forming part of Letters Patent No. 412,138, dated October 1, 1889.

Application filed May 16, 1889. Serial No. 310,962. (No model.)

*To all whom it may concern:*

Be it known that I, ROBERT W. TERRELL, a citizen of the United States, residing at Conyers, in the county of Rockdale and State of Georgia, have invented a new and useful Coffee-Pot, of which the following is a specification.

My invention relates to improvements in that class of coffee-pots which are provided with receptacles for the coffee and have a false bottom and a pipe leading upward from the same to the receptacle for the coffee, so that the water when boiling will be discharged onto the coffee and percolate through the same, so as to extract the entire strength therefrom.

The invention consists in certain novel features hereinafter described and claimed.

In the accompanying drawings, Figure 1 is a view showing the coffee-pot in vertical section and showing my improvements applied thereto. Fig. 2 is a detailed vertical section of the pipe. Fig. 3 is a detailed view of the coffee receptacle or strainer.

The coffee-pot A is constructed of sheet metal, preferably, and has the usual handle B and spout C, as shown. The vertical walls of the coffee-pot are provided on their inner faces with the annular horizontal grooves D, as shown. The false bottom E is in the shape of a scalene cone, and is provided around its edge with the radial corrugations or flutes F, through which the water will pass into the space between the said false bottom and the bottom of the coffee-pot. From the apex of the false bottom a pipe G rises and passes upward to near the top of the coffee-pot, as shown. This pipe is made in a series of sections, each of which is provided near its upper end with an annular shoulder or flange H, upon which the lower end of the next upper section of the pipe rests and by which it is supported. The several sections are made somewhat tapered, and the lower larger end of each section fits snugly over the smaller upper end of the next subjacent section and rests against the annular shoulder thereon, as before stated. The several sections can thus be easily fitted together and detached, so as to adjust the pipe to the desired height. The pipe is further provided with a detachable discharging-nozzle I, which is provided with a flared or bell-shaped mouth J, so that as the boiling water escapes from the pipe it will be allowed to spread over the entire quantity of coffee, and consequently be prevented from falling thereon in a single stream. The water is thus caused to pass more slowly through the coffee than if allowed to fall thereon in a single stream, and consequently more effectually extracts the strength from the coffee.

The coffee receptacle or strainer K consists of a divided spring-ring L, adapted to engage one of the internal annular grooves D of the coffee-pot, and a screening-cloth M, secured to said ring. The receptacle is secured within the coffee-pot by causing the ring to engage one of the grooves, with the ends of the ring adjacent to the pipe, as clearly shown in Fig. 1.

The several parts of my device being constructed in the manner just described, and arranged as shown in Fig. 1, the operation thereof will be readily understood. The ground coffee is placed in the receptacle K and water then placed in the coffee-pot in the desired quantity, and the device is then set over a fire, as will be readily understood. When the water boils, it will rise from the bottom of the coffee-pot through the vertical pipe G and be discharged therefrom onto the ground coffee. The water will then pass through the coffee and escape through the screening-cloth to the space below the same. The desired beverage will thus be very rapidly produced.

I am aware that it is not broadly new to provide a coffee-pot in which a substantially conical false bottom is employed, and in which the water is made to rise from the same through a vertical pipe and be discharged onto a coffee receptacle consisting of a ring and screening-cloth. I therefore make no claim broadly to such a device.

In my device the coffee-receptacle consists of a divided ring and is not secured to the vertical pipe, so that it can be supported within the coffee-pot at the desired height, and can be readily removed from the coffee-pot without necessitating the removal of the pipe or false bottom. By employing a divided ring, furthermore, the pipe is allowed to pass through the coffee-receptacle without necessitating a special construction thereof.

Special stress is laid on the adjustability of the vertical pipe. In practice it has been found that the boiling water will not flow continuously through the pipe unless the level of the water was very near the end of the pipe, so that it was impossible to make less than a pot full of coffee. In my device, however, this defect is obviated, as when it is desired to make a smaller quantity of coffee the pipe is adjusted to the proper height by removing some of the sections and then supporting the receptacle K in the proper groove of the coffee-pot.

My improved device is very simple in its construction, and can be manufactured and sold at a slight cost, and its advantages are thought to be evident from the foregoing description.

Having thus described my invention, what I claim, and desire to secure by Letters Patent, is—

1. In a coffee-pot, the combination, with the fountain attachment, of the divided spring-ring and the straining-cloth secured thereto, whereby the tube of the fountain attachment may pass upward without cutting the cloth, as set forth.

2. The improved coffee-pot herein described and shown, consisting of the coffee-pot A, having a series of internal annular grooves, the divided spring-ring adapted to engage one of said grooves, the screening-cloth secured to said ring, the false bottom within the coffee-pot, the vertical pipe rising from the said false bottom and consisting of a series of sections detachably fitted together and passing upward between the ends of the divided spring-ring, and the discharging-nozzle removably fitted on the upper end of the said pipe and having a flared mouth, as specified.

In testimony that I claim the foregoing as my own I have hereto affixed my signature in presence of two witnesses.

ROBERT W. TERRELL.

Witnesses:
 FRANK P. SIMS,
 FLAVIUS W. REDWINE.